United States Patent [19]
Obara et al.

[11] Patent Number: 5,556,209
[45] Date of Patent: Sep. 17, 1996

[54] DOUBLE-ROW BALL BEARING

[75] Inventors: Rikuro Obara; Katashi Tatsuno, both of Nagano-ken, Japan

[73] Assignee: Minebea Kabushiki-Kaisha, Nagano-ken, Japan

[21] Appl. No.: 318,942

[22] Filed: Oct. 6, 1994

Related U.S. Application Data

[63] Continuation-in-part of Ser. No. 999,647, Dec. 31, 1992, abandoned.

[30] Foreign Application Priority Data

Oct. 6, 1992 [JP] Japan ..................... 4-292126

[51] Int. Cl.⁶ .................................. F16C 33/60
[52] U.S. Cl. .......................... 384/504; 384/517
[58] Field of Search ................... 384/449, 453, 384/493, 494, 499–506, 510, 512–519

[56] References Cited

U.S. PATENT DOCUMENTS

| | | | |
|---|---|---|---|
| 2,037,982 | 4/1936 | Hughes | 384/506 |
| 2,433,518 | 12/1947 | Ljunggren | 384/517 |
| 2,502,874 | 4/1950 | Moore | 384/517 |
| 3,167,364 | 1/1965 | Dunn | 384/510 |
| 3,578,829 | 5/1971 | Hata | 384/518 X |
| 3,986,754 | 10/1976 | Torrant | 384/504 |
| 4,607,182 | 8/1986 | Ballhaus | 384/512 X |
| 4,719,352 | 1/1988 | Miyatake et al. | 384/518 X |
| 4,850,719 | 7/1989 | Moseley et al. | 384/517 X |
| 4,883,370 | 11/1989 | Nakanishi | 384/537 X |
| 4,907,897 | 3/1990 | Shirotori | 384/512 X |
| 4,958,945 | 9/1990 | Nakanishi | 384/512 |
| 5,226,737 | 7/1993 | Sandy, Jr. | 384/512 |

FOREIGN PATENT DOCUMENTS

| | | | |
|---|---|---|---|
| 1239542 | 4/1967 | Germany | 384/494 |
| 3038112 | 4/1982 | Germany | 384/517 |
| 3101596 | 8/1982 | Germany | 384/517 |

*Primary Examiner*—Thomas R. Hannon
*Attorney, Agent, or Firm*—Lowe, Price, LeBlanc & Becker

[57] ABSTRACT

A double-row ball bearing comprises an axle (1) and a sleeve (2). In such ball bearing: a pre-load is axially applied to one of a short straight tube type inner ring (6) which is mounted on the axle (1) and a short straight tube type outer ring (10) which is mounted in a sleeve (2); and the inner ring (6) is fixed to the axle (1) or the outer ring (10) is fixed to the sleeve (2), in a condition in which the pre-load is applied.

5 Claims, 5 Drawing Sheets

DOUBLE-ROW BALL BEARING

This application is a continuation-in-part application of U.S. Ser. No. 07/999,647, filed Dec. 31, 1992 now abandoned.

BACKGROUND OF THE INVENTION

1. Field of the Invention

The present invention relates to a double-row ball bearing which is particularly adaptable to office automation instruments.

2. Description of the Prior Art

In ball bearings, there is a so-called "direct type of ball bearing" in which a ball race is directly formed in an outer peripheral surface of an axle.

In such a direct type of ball bearing, in case that the ball bearing has a single row of balls only, it is very easy to have the balls aligned with each of an axle ball race (which is formed in an outer peripheral surface of the axle) and an outer-ring ball race (which is formed in an inner peripheral surface of an outer ring). In contrast with this, in case that the ball bearing has a pair of rows of balls, i.e., in case that the ball bearing is of a double-row type, it is very difficult to have the balls and the races aligned with the races.

This will be described with reference to FIG. 10 which shows a conventional double-row ball bearing in which: a pair of axle ball races 101a, 101b are formed in an outer peripheral surface of an axle 100 so as to extend circumferentially; a pair of outer-ring ball races 103a, 103b are formed in an inner surface of an outer ring 102; a plurality of balls 104a and 104b are disposed between the axle ball race 101a and the outer-ring ball race 103a, and between the axle ball race 101b and the outer-ring ball race 103b, respectively.

In the double-row ball bearing having the above construction, the following equation must be satisfied:

$$B > A \text{ or } A > B$$

where: "A" denotes the distance between center lines of the axle ball races 101a, 101b; and "B" denotes the distance between center lines of the outer-ring ball races 103a, 103b.

In case that "B" is too much larger than "A" or "A" is too larger than "B", excessive loads are applied to the balls and the races to thereby deform the same so that the ball bearing is damaged.

In the conventional double-row ball bearing, a pair of outer-ring ball races 103a and 103b are previously formed in the inner peripheral surface of the outer ring 102 so as to correspond to the pair of axle ball races 101a and 101b of the axle 1, respectively.

Consequently, such outer-ring ball races 103a, 103b must be formed so as to precisely correspond to the axle ball races 101a, 101b. Further, in assembling of the outer ring 102 with the axle 100, it is necessary to keep the pre-load at a proper value, which requires the assembling work to be conducted in an extremely precise manner. In addition, once the bearing is assembled, the thus assembled bearing can not be adjusted later.

SUMMARY OF THE INVENTION

It is an object of the present invention to provide a double-row ball bearing which: allows a pre-load be easily applied to an inner ring (which is mounted on an axle) or to an outer ring (which is mounted in a sleeve); enables to be precisely applied; is excellent in rigidity; improved in so-called "raceway run-out with side"; is excellent in properties resistant to vibration; is easily assembled, which reduces manufacturing costs of the double-row ball bearings of the present invention.

The above object of the present invention is accomplished by providing:

A double-row ball bearing comprising an axle and a sleeve, wherein:

a pre-load is applied to one of a short straight tube type inner ring which is mounted on the axle and a short straight tube type outer ring which is mounted on a sleeve; and the inner ring is fixed to the axle or the outer ring is fixed to the sleeve, in a condition in which the pre-load is applied suitably.

The above object of the present invention is accomplished by providing:

A double-row ball bearing comprising axle and a sleeve, wherein:

an axle ball race is formed in an outer peripheral surface of the axle, while a sleeve ball race is formed an inner peripheral surface of the sleeve, so that a plurality of balls are disposed between the axle ball race and the sleeve ball race;

a short straight tube type inner ring, which has an inner-ring ball race formed in its outer peripheral surface, is slidably mounted on the axle, while another sleeve ball race is formed in the inner peripheral surface of the sleeve, so that a plurality of balls are disposed between the inner-ring ball race and the sleeve ball race;

a pre-load is axially applied to the inner ring; and the inner ring is fixed to the axle in a condition in which the pre-load is applied suitably.

The above object of the present invention can also be accomplished by providing:

A double-row ball bearing comprising an axle and a sleeve, wherein:

an axle ball race is formed in an outer peripheral surface of the axle;

a sleeve ball race is formed in an inner peripheral surface of the sleeve so that a plurality of balls are disposed between the axle ball race and the sleeve ball race;

another axle ball race is formed in the outer peripheral surface of the axle, while an outer-ring ball race is formed in an inner peripheral surface of an outer ring which is slidably mounted in the sleeve, so that a plurality of balls are disposed between another axle ball race and the outer-ring ball race;

a pre-load is axially applied to the outer ring suitably; and the outer ring is fixed to the sleeve in a condition in which the pre-load is applied adequately.

The above object of the present invention can also be accomplished by providing:

A double-row ball bearing comprising an axle and a sleeve, wherein:

an axle ball race is formed in an outer peripheral surface of the axle;

a sleeve ball race is formed in an inner peripheral surface of the sleeve, so that a plurality of balls are disposed between the axle ball race and the sleeve ball race;

a ball bearing which comprises a short straight tube type inner ring, a short straight tube type outer ring and a plurality of balls disposed between: an inner-ring ball race formed in the inner ring; and an outer-ring ball race formed in the outer ring has its inner ring mounted on the axle and has its outer ring mounted in the sleeve;

a pre-load is axially applied to one of the inner ring and the outer ring; and in a condition in which the pre-load is applied suitably, the inner ring is fixed to the axle or the outer ring is fixed to the sleeve.

The above object of the present invention can also be accomplished by providing:

A double-row ball bearing having a construction in which:

an axle ball race is formed in an outer peripheral surface of an axle, while a short straight tube type inner ring is slidably or unslidably mounted on the axle;

an outer-ring ball race is formed in an inner peripheral surface of a short straight tube type outer ring which is slidably or unslidably mounted in a sleeve, so that a plurality of balls are disposed between the axle ball race and the outer-ring ball race;

an inner-ring ball race is formed in an outer peripheral surface of the inner ring, while a sleeve ball race is formed in an inner peripheral surface of the sleeve, so that a plurality of balls are disposed between the inner-ring ball race and the sleeve ball race;

a pre-load is axially applied to at least one of the inner ring and the outer ring; and in a condition in which the pre-load is applied suitably, the inner ring is fixed to the axle or/and the outer ring is fixed to the sleeve.

The above object of the present invention can also be accomplished by providing:

A double-row ball bearing having a construction in which:

an axle ball race is formed in an outer peripheral surface of an axle, while an inner-ring ball race is formed in an outer peripheral surface of a short straight tube type inner ring;

a sleeve ball race is formed in an inner peripheral surface of each of a pair of sleeves (each of which serves as an outer ring, and is so provided as to correspond in position to each of the axle and the inner ring);

a plurality of balls are disposed between the axle ball race and one of the sleeve ball races, and between the inner-ring ball race and the other of the sleeve ball races;

a pre-load is axially applied to each of the sleeves.

The above object of the present invention can also be accomplished by providing:

A double-row ball bearing comprising an axle and a sleeve, wherein:

an inner-ring ball race is formed in an outer peripheral surface of short straight tube type inner rings which are mounted on the axle, and at least one of the inner rings is axially slidable relative to the axle;

a pair of sleeve ball races are formed in an inner peripheral surface of the sleeve;

a plurality of balls are disposed between one of the inner-ring ball races and one of the sleeve ball races, and between the other of the inner-ring ball races and the other of the sleeve ball races;

a pre-load is axially applied to the axially slidable one of the inner rings; and the axially slidable one of the inner rings is fixed to the axle in a condition in which the pre-load is applied suitably.

DESCRIPTION OF THE PREFERRED EMBODIMENTS

Hereinbelow, the present invention will be described in detail with reference to embodiments shown in the accompanying drawings.

All the embodiments of the present invention are double-row ball bearings each of which is provided with an axle and a sleeve which forms an outer ring corresponding to the axle.

Figure 1:
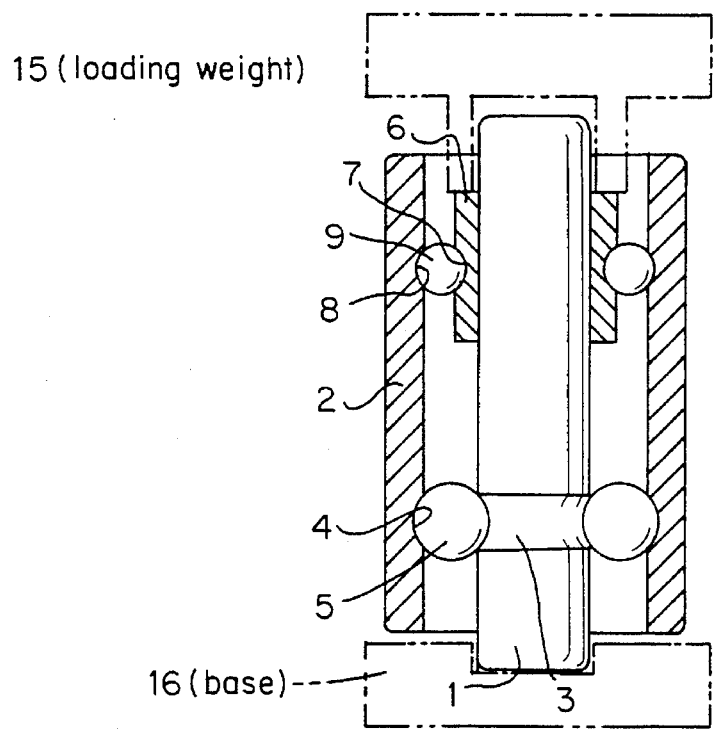
FIG. 1 is a longitudinal sectional view of a first embodiment of the double-row ball bearing of the present Invention

In a first embodiment of a double-row ball bearing of the present invention shown in FIG. 1, an axle ball race 3 and an outer-ring ball race 4 are formed in an outer peripheral surface of the axle 1 and an inner peripheral surface of the sleeve 2, respectively. A plurality of balls 5 are disposed between these ball races 3 and 4. An inner ring 6 is fixedly mounted on the axle 1. The inner ring is not of an angular type, but rather is of a short straight tube type. An inner-ring ball race 7 and another outer-ring ball race 8 are formed in an outer peripheral surface of the inner ring 6 and the inner peripheral surface of the sleeve 6, respectively. A plurality of balls 9 are disposed between these ball races 7 and 8.

In manufacturing of the double-row ball bearing having the above construction, the inner ring 6 is slidably mounted on the axle 1 so as to be axially movable along the axle 1. Then, the thus mounted inner ring 6 is subjected to a pre-load applied to the upper face of the inner ring 6 by a loading weight 15 as viewed in FIG. 1, so that the inner ring 6 is slightly moved. After the axial clearance reaches a predetermined value, the inner ring 6 is fixed to the axle 1 with a suitable adhesive agent or the like. The numeral 16 denotes a base which is holding the bottom of the double-row bearing in pre-loading.

A method for applying the pre-load to the inner ring 6 of the double-row ball bearing of the present invention can be any one of the following methods: one using a weight; one using a spring; one using shims; one using spacers; and, one using screws.

Figure 2:
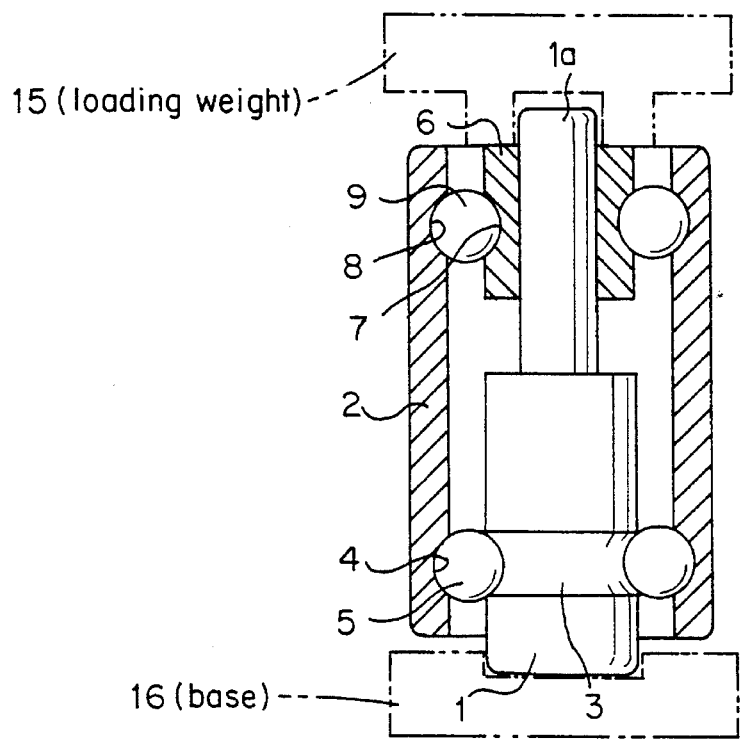
FIG. 2 is a longitudinal sectional view of a second embodiment of the double-row ball bearing of the present invention.

In a second embodiment of the double-row ball bearing of the present invention shown in FIG. 2, the axle 1 is of the shoulder type provided with a small-diameter axle portion 1a on which the inner ring 6 is fixedly mounted. The remaining components of the double-row ball bearing shown in FIG. 2 are the same in construction as those of the double-row ball bearing shown in FIG. 1. In manufacturing of the double-row ball bearing shown in FIG. 2, the preload is applied to the inner ring 6 by the loading weight 15.

Figure 3:
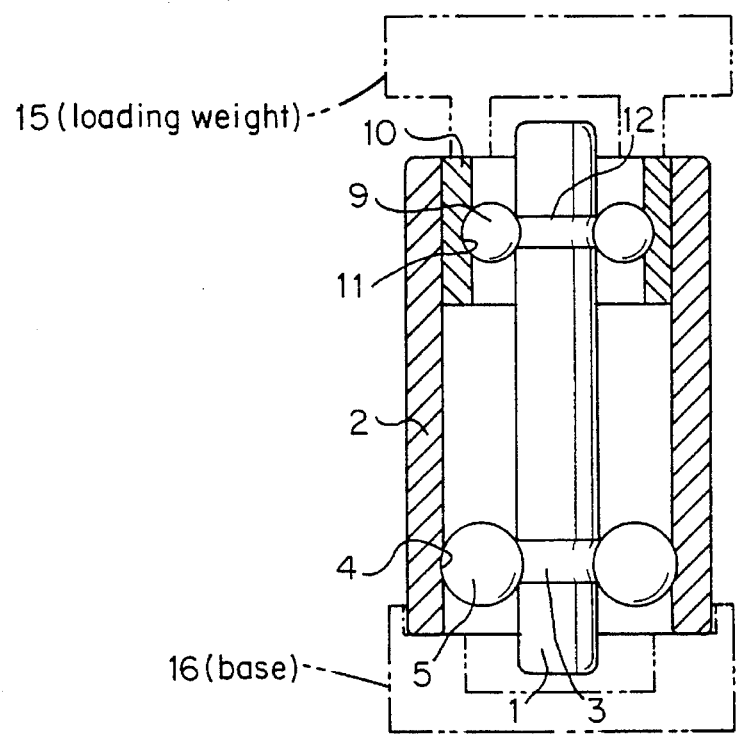
FIG. 3 is a longitudinal sectional view of a third embodiment of the double-row ball bearing of the present invention.

FIG. 3 shows a third embodiment of the double-row ball bearings of the present invention, respectively. In the embodiment of FIG. 3, an outer ring 10 forming the above-mentioned another outer-ring ball race is mounted on an inner surface of the sleeve 2. The outer ring 10 is not of an angular type, but rather is of a short straight tube type. The balls 9 are disposed between: an outer-ring ball race 11 formed in an inner peripheral surface of the outer ring 10; and another axle ball race 12 formed in an outer peripheral surface of the axle 1. In the double-row ball bearing shown in FIG. 3, the sleeve 2 keeps its inner diameter constant over the full length thereof.

In manufacturing of the double-row ball bearings shown in FIG. 3, the outer ring 10 is slidably mounted on the axle 1. Then, a pre-load is applied to the upper face of the thus mounted outer ring 10 by the loading weight 15 as viewed in FIG. 3. After that, the outer ring 10 is fixed to the axle 1 with a suitable adhesive agent or the like.

Figure 4:
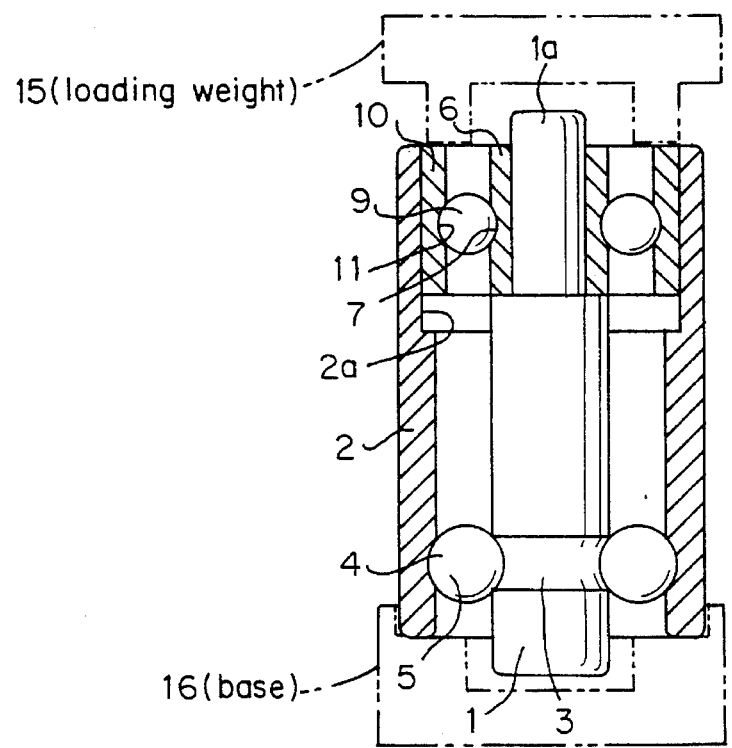
FIG. 4 is a longitudinal sectional view of a fourth embodiment Of the double-row ball bearing of the present invention.
Figure 5:
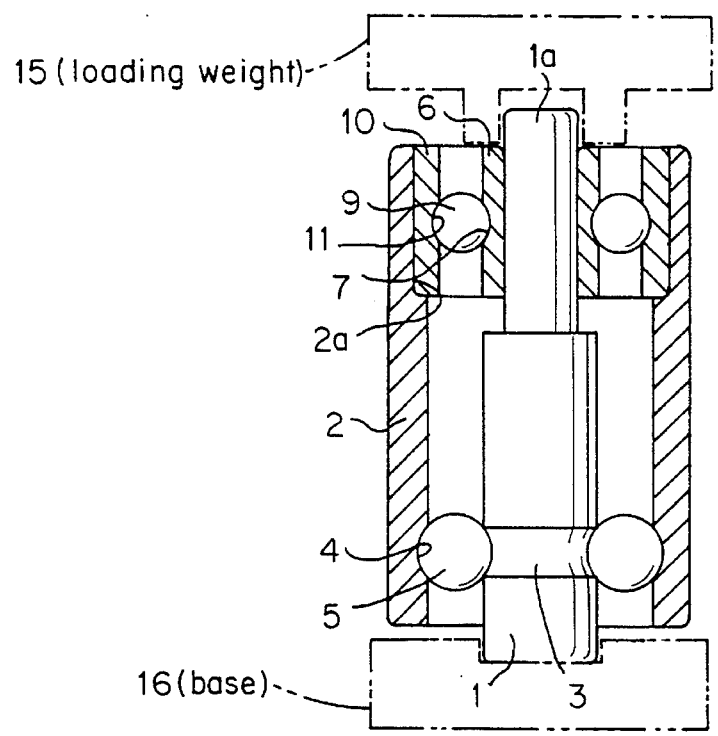
FIG. 5 is a longitudinal sectional view of a fifth embodiment of the double-row ball bearing of the present invention.

In each of the fourth and a fifth embodiments of the double-row ball bearings of the present invention shown in FIGS. 4 and 5, respectively: the axle 1 is of the shoulder type provided with a small-diameter portion 1a; the sleeve 2 is of the shoulder type provided with the large-diameter portion 2a; and, a ball bearing having the balls is interposed between the small-diameter portion 1a of the axle 1 and the large-diameter portion 2a of the sleeve 2. Both of an inner ring 6 and an outer ring 10 of the ball bearing are not angular type, but of the short straight tube type.

In manufacturing of the double-row ball bearing shown in FIG. 4, the outer ring 10 is slidably mounted in the sleeve 2. Then, a pre-load is applied to the thus mounted outer ring 10 by the loading weight 15. Under such circumstances, the outer ring 10 is fixed to the sleeve 2 with a suitable adhesive agent or the like.

In manufacturing of the double-row ball bearing shown in FIG. 5, the inner ring 6 is slidably mounted on the small-diameter portion 1a of the axle 1. Then, a pre-load is applied to the thus mounted inner ring 6 by the loading weight 15. After that, the inner ring 6 is fixed to the small-diameter portion 1a of the axle 1 with a suitable adhesive agent.

Figure 6:
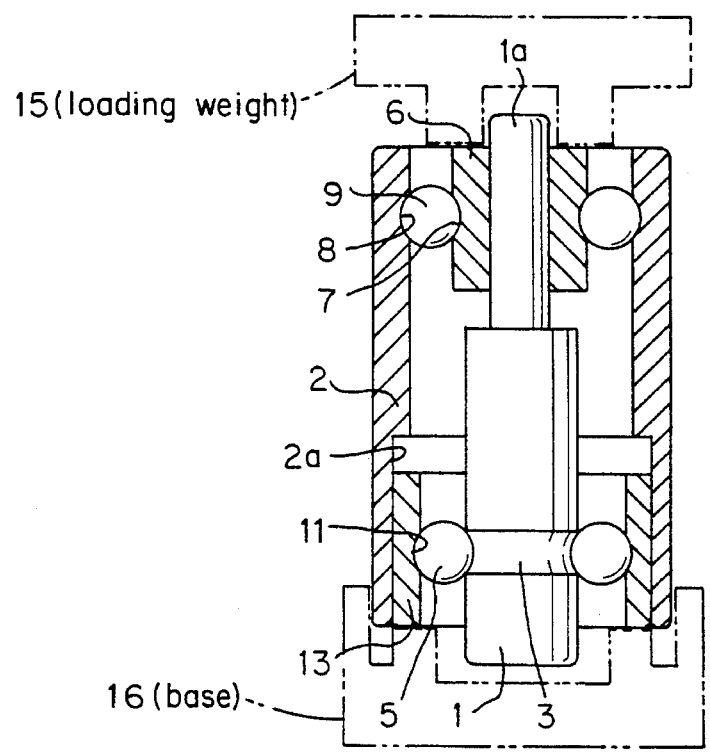
FIG. 6 is a longitudinal sectional view of a sixth embodiment of the double-row ball bearing of the present invention.
Figure 7:
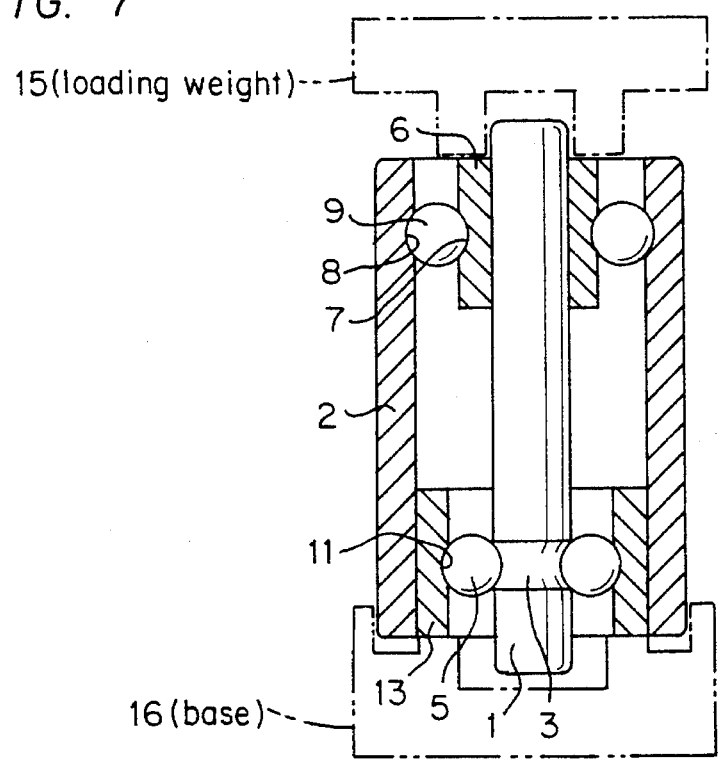
FIG. 7 is a longitudinal sectional view of an seventh embodiment of the double-row ball bearing of the present invention.

FIGS. 6 and 7 show a sixth and a seventh embodiment of the double-row ball bearings of the present invention, respectively. Each of these embodiments of the present invention has the outer ring 13 disposed in one of its opposite sides and the inner ring 6 disposed in the other side. These double-row ball bearings shown in FIGS. 6 and 7 differ from each other in that: the former uses the sleeve 2 of the shoulder type provided with the large-diameter portion 2a and the axle 1 of the shoulder type provided with the small-diameter portion 1a; while the latter uses the sleeve 2 of the straight type and the axle 1 of the straight type.

In manufacturing of each of these double-row ball bearings shown in FIGS. 6 and 7: both the inner ring 6 and the outer ring 13 are slidably mounted on the axle 1 and in the sleeve 2, respectively; then, a pre-load is applied to each of the thus mounted inner ring 6 and outer ring 13 by the loading weight 15; and, thereafter, the inner ring 6 and the outer ring 13 are fixed to the axle 1 and the sleeve 2 with a suitable adhesive agent, respectively.

Figure 8:
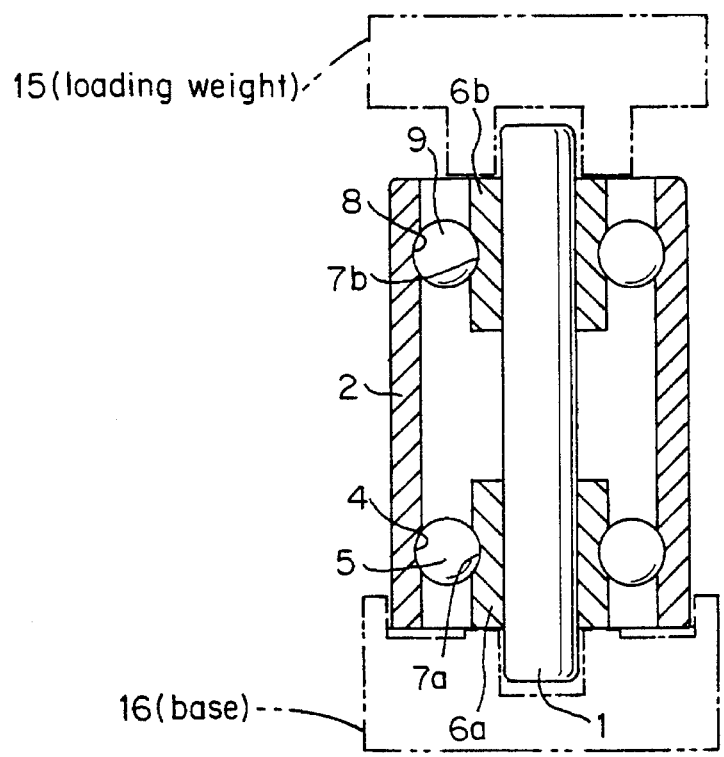
FIG. 8 is a longitudinal sectional view of a eighth embodiment of the double-row ball bearing of the present invention.
Figure 9:
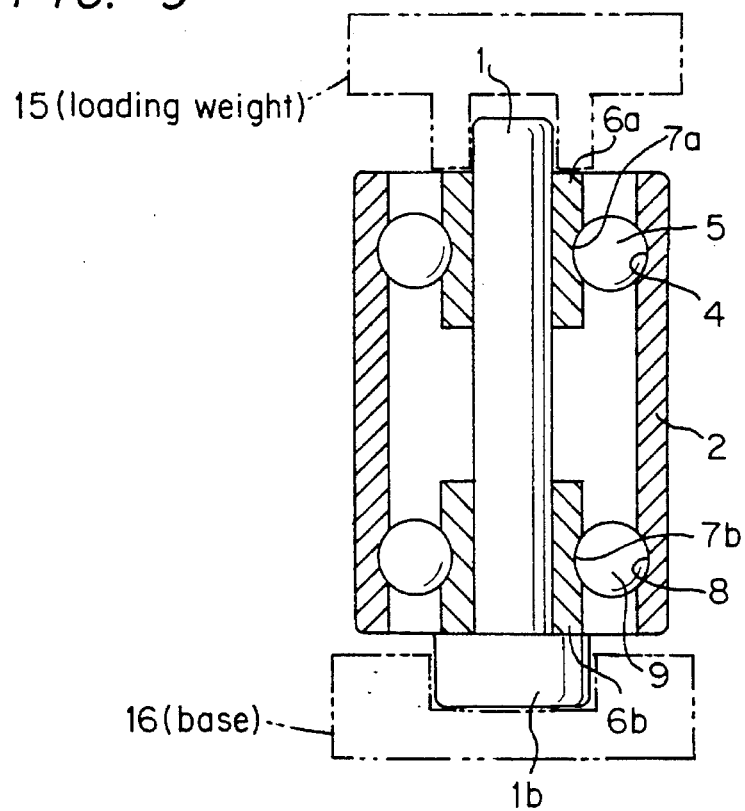
FIG. 9 is a longitudinal sectional view of a ninth embodiment of the double-row ball bearing of the present invention.
Figure 10:
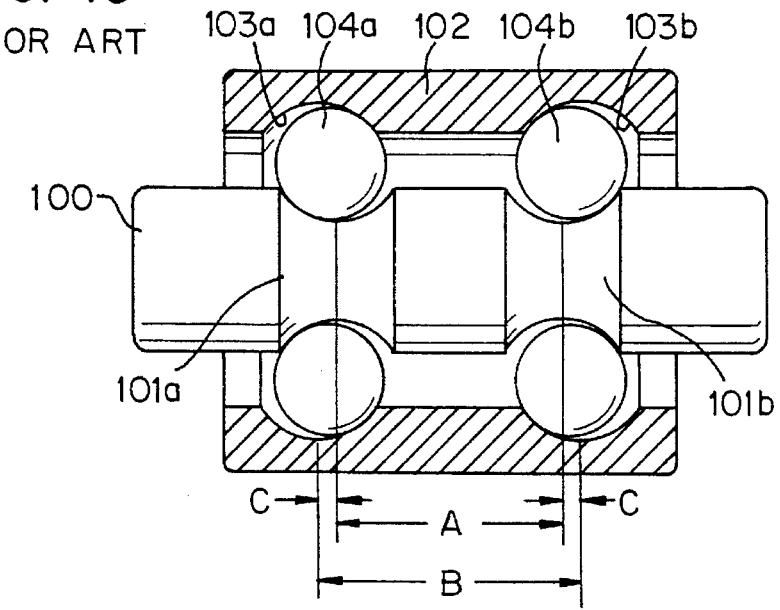
FIG. 10 is a longitudinal sectional view of the prior art double-row ball bearing.

FIGS. 8 and 9 show an eighth and a ninth embodiment of the double-row ball bearings of the present invention, respectively. In each of these embodiments, the sleeve 2 serves as an outer ring.

In each of these double-row ball bearings shown in FIGS. 8 and 9: a pair of the inner rings 6a, 6b (both of which are not of the angular type, but are, instead, of the short straight tube type) are slidably mounted on the axle 1; inner-ring ball races 7a and 7b are formed in outer peripheral surfaces of the inner rings 6a and 6b, respectively; a pair of sleeve ball races 4 and 8 are formed in the inner peripheral surface of the sleeve 2 to correspond respectively in position to the inner-ring ball races 7a and 7b; and, balls 5 and 9 are disposed between the thus corresponding races 4 and 7a, and between the thus corresponding races 8 and 7b, respectively. Thereafter, a pre-load is applied to each of the inner rings 6a and 6b by the loading weight 15 both of which are then fixed to the axle 1 with a suitable adhesive agent.

In manufacturing of the double-row ball bearing of the present invention, since the inner ring (which is mounted on the axle) or the outer ring (which is mounted on the sleeve) is axially slidable, it is possible to easily apply a pre-load to the axially slidable one. Consequently, it is possible to provide double-row ball bearings, each of which is: excellent in rigidity; improved in so-called "raceway run-out with side"; and, excellent in properties resistant to vibration. In addition, each of the double-row ball bearings of the present invention is easily assembled, which reduces manufacturing costs.

What is claimed is:

1. A double-row ball bearing comprising (a) a stepped axle (1) having a large diameter portion and a small diameter portion (1a) and a sleeve (2), (b) an axle ball race (3) formed on an outer peripheral surface of said large diameter portion of said stepped axle (1),
   a first sleeve ball race (4) formed on a first portion of an inner peripheral surface of said sleeve (2), and
   a plurality of balls (5) disposed between said axle ball race (3) and said first sleeve ball race (4); and (c) a slidable short straight tubular inner ring (6),
   said tubular inner ring having an inner-ring ball race (7) formed on its outer peripheral surface,
   said tubular inner ring slidably mounted on said small diameter portion (1a) of said axle (1),
   a second sleeve ball race (8) formed on a second portion of the inner peripheral surface of said sleeve (2) spaced apart from said first portion of said inner peripheral surface, and
   a plurality of balls (9) disposed between said inner-ring ball race (7) and said second sleeve ball race (8); and
   means for adhesively fixing said slidable inner ring (6) on said axle (1) under a pre-loaded condition.

2. A double-row ball bearing comprising:

a stepped axle (1) having a large diameter portion and a small diameter portion (1a), and a sleeve (2), a first ball bearing, including:
   an axle ball race (3) formed in an outer peripheral surface of said large diameter portion of said stepped axle (1),
a sleeve ball race (4) formed in an inner peripheral surface of said sleeve (2) and a plurality of balls (5) disposed between said axle ball race (3) and said sleeve ball race (4);

a second ball bearing, including:
   a straight tubular inner ring (6), a straight tubular outer ring (10) and a plurality of balls (9) disposed between an inner-ring ball race (7) formed in said inner ring (6) and an outer-ring ball race (11) formed in said outer ring (10), wherein said inner ring (6) is slidably mounted on said small diameter portion (1*a*) of said axle (1) and said outer ring (10) is slidably mounted in said sleeve (2); and means for adhesively fixing said inner ring (6) to said axle (1) and said outer ring (10) to said sleeve and for adhesively fixing either said inner ring (6) or said outer ring (10) under a pre-loaded condition.

3. A double-row ball bearing in accordance with claim 2, wherein each of said first and second ball bearings is free of adjusting ring structures.

4. A double-row ball bearing comprising:

a stepped axle (1) having a large diameter portion and a small diameter portion (1*a*), and a sleeve (2), a straight tubular outer ring (13) slidably mounted in said sleeve (2), an axle ball race (3) formed in an outer peripheral surface of said large diameter portion of said axle (1), an outer-ring ball race (11) formed in an inner peripheral surface of said tubular outer ring (13), and a plurality of balls (5) disposed between said axle ball race (3) and said outer-ring ball race (11);

a straight cylindrical tubular inner ring (6) slidably mounted on said small diameter portion (1*a*) of said axle (1), an inner-ring ball race (7) formed in an outer peripheral surface of said inner ring (6), a sleeve ball race (8) is formed in an inner peripheral surface of said sleeve (2), and a plurality of balls (9) disposed between said inner-ring ball race (7) and said sleeve ball race (8); and means for adhesively fixing said inner ring (6) on said axle (1) under a pre-loaded condition.

5. A double-row ball bearing in accordance with claim 4, wherein said bearing is free of adjusting ring structures.

* * * * *